ELECTROHYDRAULIC ACTUATOR

Filed March 8, 1960 8 Sheets-Sheet 1

WILLIAM H. L. CASASSA, JR.
RICHARD D. SIBLEY
INVENTORS

BY Flam and Flam

ATTORNEYS.

April 9, 1963 W. H. L. CASASSA, JR., ETAL 3,084,513

ELECTROHYDRAULIC ACTUATOR

Filed March 8, 1960 8 Sheets-Sheet 2

WILLIAM H. L. CASASSA, JR.
RICHARD D. SIBLEY
INVENTORS

BY Flam and Flam

ATTORNEYS.

WILLIAM H. L. CASASSA, JR.
RICHARD D. SIBLEY
INVENTORS

BY Flam and Flam

ATTORNEYS.

ELECTROHYDRAULIC ACTUATOR

Filed March 8, 1960 8 Sheets-Sheet 4

WILLIAM H. L. CASASSA, JR.
RICHARD D. SIBLEY
INVENTORS.

BY Flam and Flam
ATTORNEYS.

INVENTOR.
WILLIAM H. L. CASASSA, JR.
RICHARD D. SIBLEY
BY Flam and Flam
ATTORNEYS.

WILLIAM H. L. CASASSA, JR.
RICHARD D. SIBLEY
INVENTORS.

BY Flam and Flam
ATTORNEYS.

WILLIAM H. L. CASASSA, JR.
RICHARD D. SIBLEY
INVENTORS

BY Flam and Flam
ATTORNEYS.

ELECTROHYDRAULIC ACTUATOR

Filed March 8, 1960 8 Sheets-Sheet 8

INVENTORS.
WILLIAM H. L. CASASSA, JR.
RICHARD D. SIBLEY
BY Flam and Flam
ATTORNEYS.

3,084,513
ELECTROHYDRAULIC ACTUATOR

William H. L. Casassa, Jr., Orange, and Richard D. Sibley, Anaheim, Calif., assignors to General Controls Co., Glendale, Calif., a corporation of California Filed Mar. 8, 1960, Ser. No. 13,653
11 Claims. (Cl. 60—52)

This invention relates to actuators, such for example that may be used to operate valve closures, particularly of the gate valve type. The invention, however, is not limited to any specific type of load.

Gate valves are often provided with a closure having a threaded stem; the stem extends through a yoke which is provided with an internally threaded yoke bushing. By rotation of the bushing in a proper direction while confined against axial movement, the stem can be moved to cause opening or closing of the valve. Such valves are often of considerable size, and accordingly it is common to use power means to rotate the bushing for moving the gate to any desired open position or to closed position.

One of the well-known forms of power means for effecting opening or closing movement is an electric motor, provided with circuit controls to limit movement of the gate closure. Such control systems are in some respects complex.

It is one of the objects of this invention to provide a simplified hydraulic system for moving a member (such as a valve closure) to any desired position.

It is another object of this invention to make it possible to adjust the speed of the valve gate motion without requiring adjustment of the prime mover of the pump that provides liquid under pressure to the system.

It is still another object of this invention to provide an electric motor for driving the pump, the motor being so controlled that it is automatically deenergized should the pump be required to deliver pressure beyond a safe value to the actuating mechanism.

It is still another object of this invention to provide automatically for complete sealing closure of the gate in its seat, to be effected by an increase in pressure automatically attained when the gate arrives at its seat.

It is another object of this invention to provide a pressure responsive circuit controller that can be readily adjusted to effect a controlling function for the pump system at any predetermined maximum pressure existing in the hydraulic system.

The actuating mechanism operated by hydraulic pressure includes a crown cam in driving relation to the bushing. The cam is urged to turn by operation of hydraulic pistons arranged equiangularly around the crown cam, and contacting the cam. The pistons move along lines parallel to the axis of the cam and the bushing. It is another object of this invention to improve, in general, apparatus of this character, and particularly by simplification of the valving for the operation of the pistons. This valving means is so arranged that reversal of the cam rotation, and consequently of the yoke bushing, is effected by a simple adjustment.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings.

Figures 3, 4:
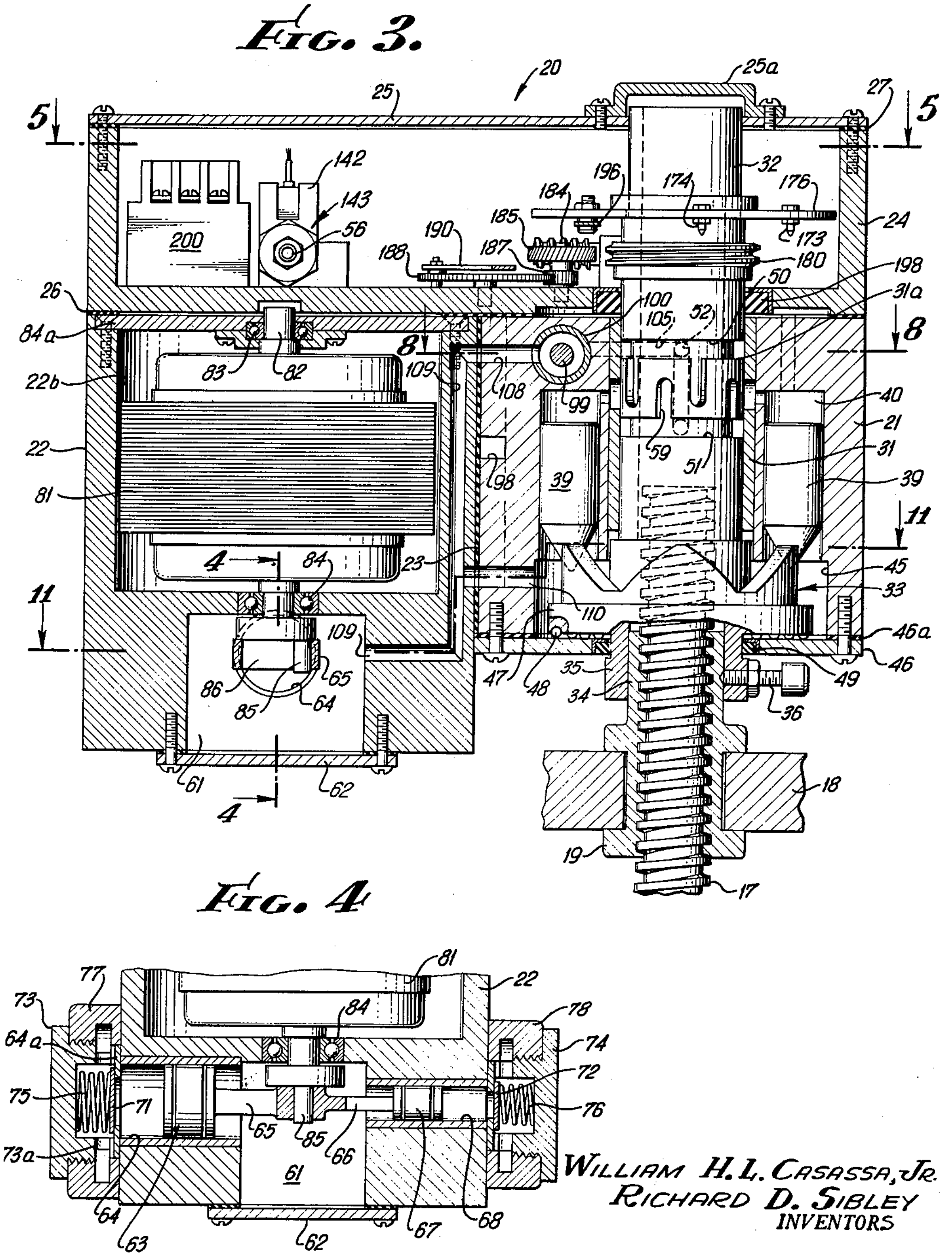
FIG. 3 is an enlarged fragmentary sectional view, taken along a plane corresponding to line 3—3 of FIG. 2.
Figures 3A, 14:
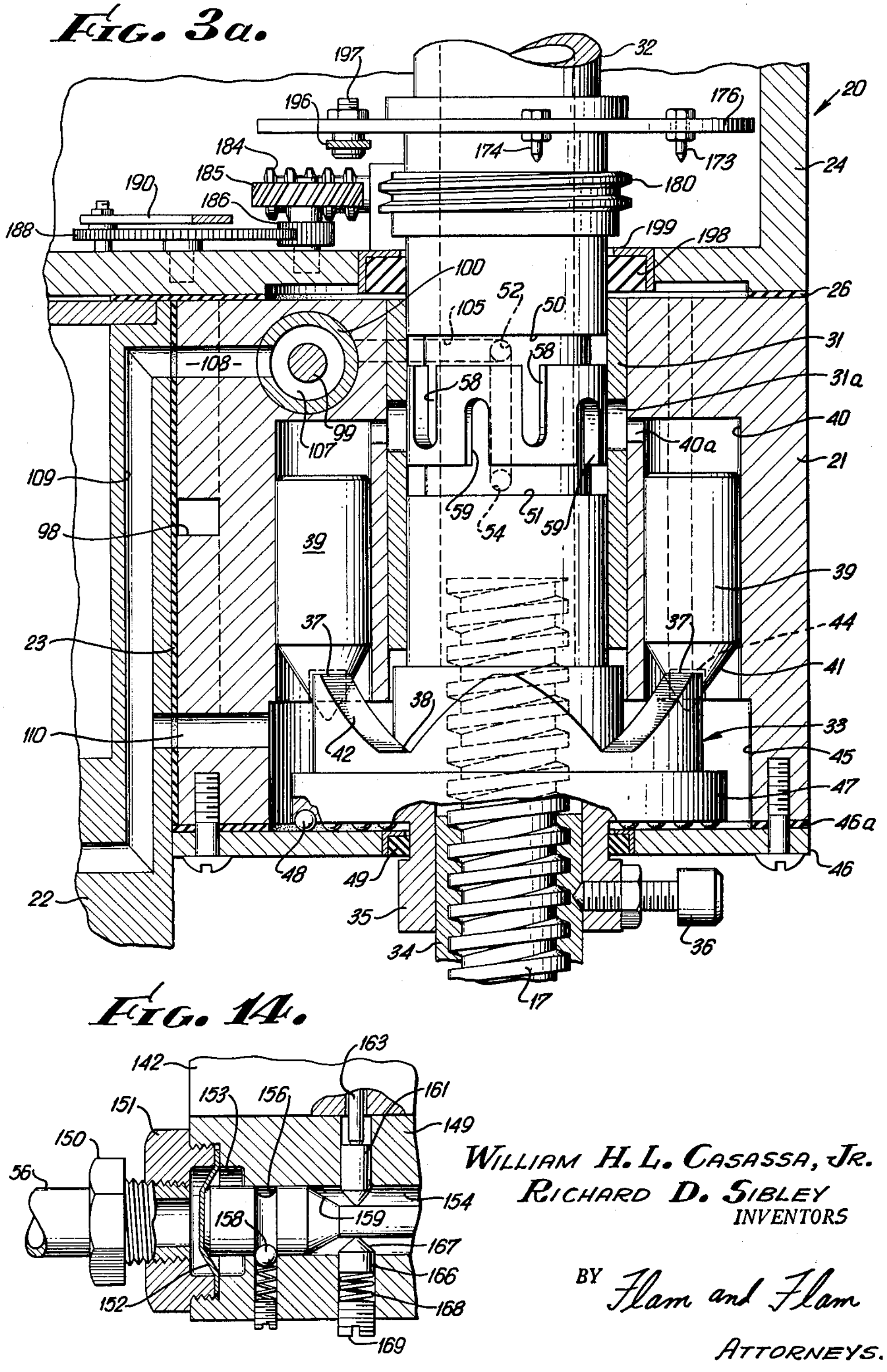
Figure 5:
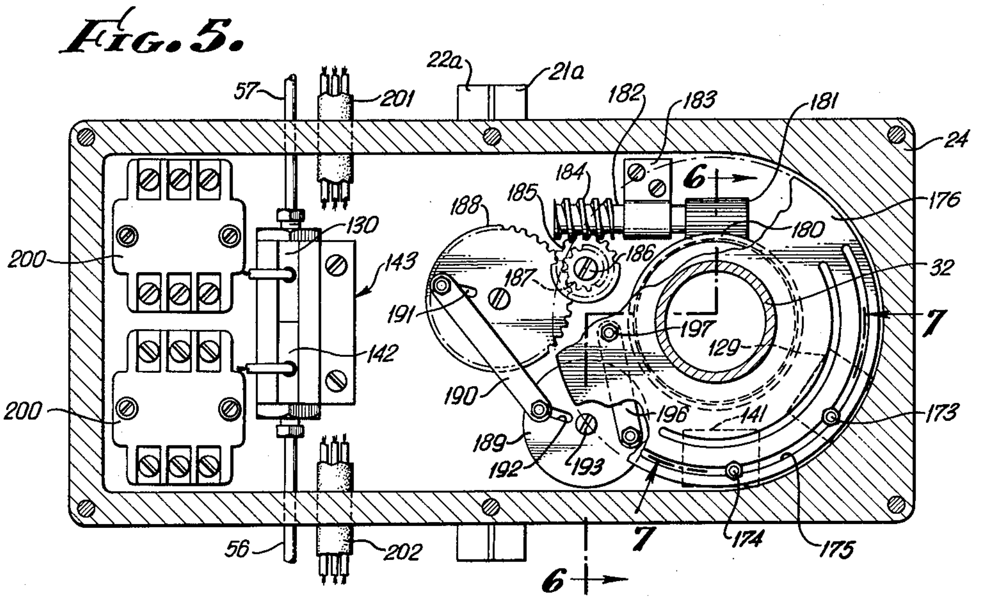
Figure 6:
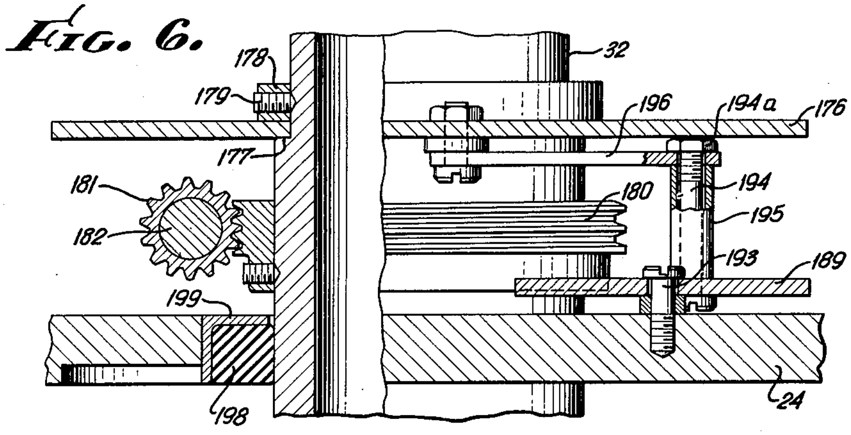
Figure 7:
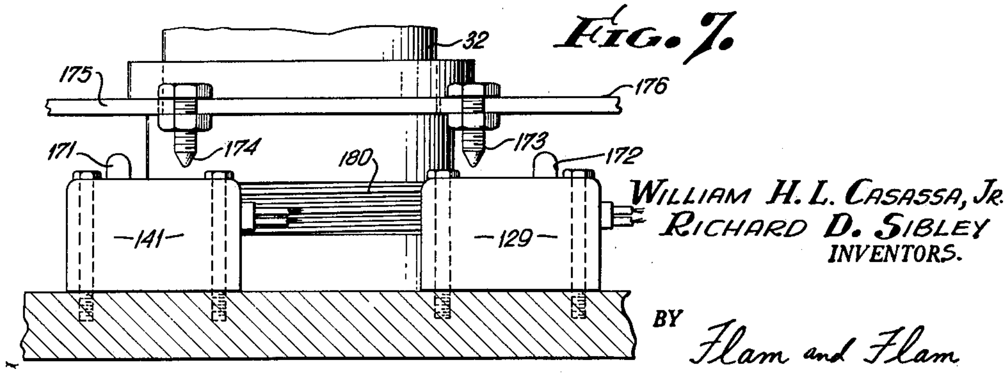
Figures 8, 9, 10:
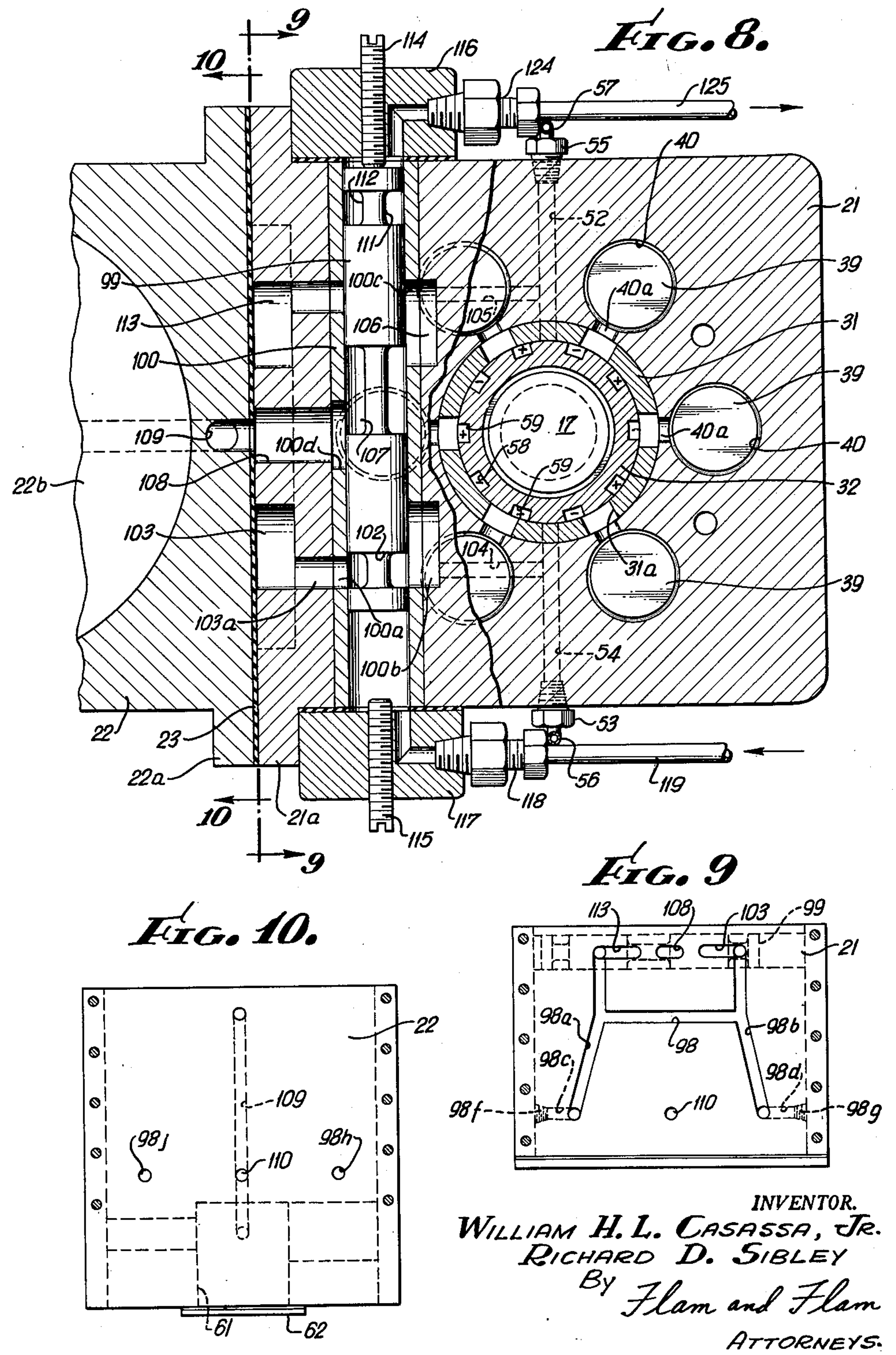
Figure 11:
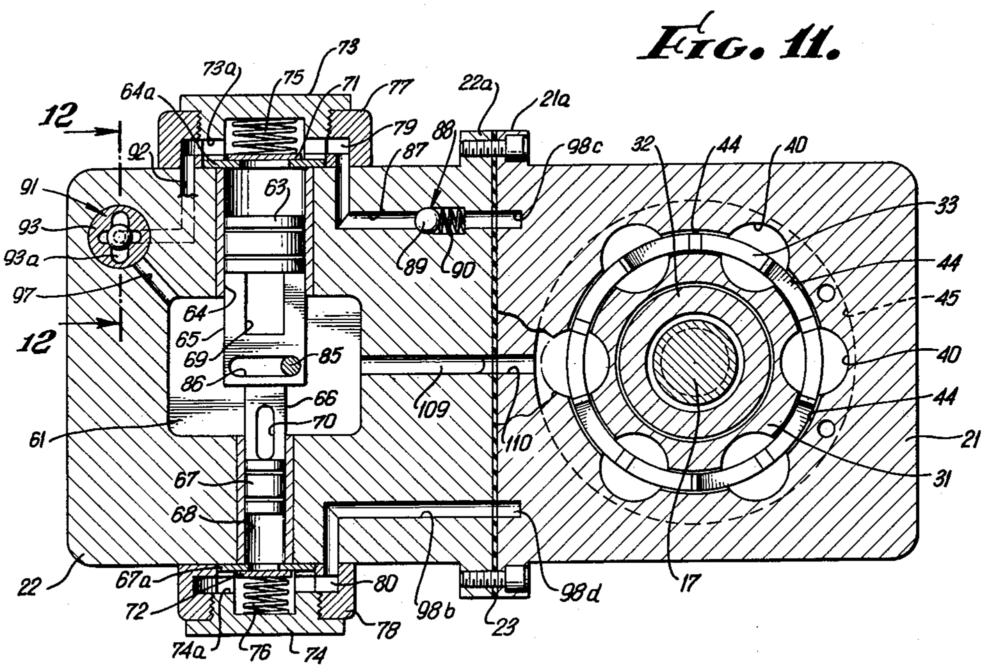
Figure 13:
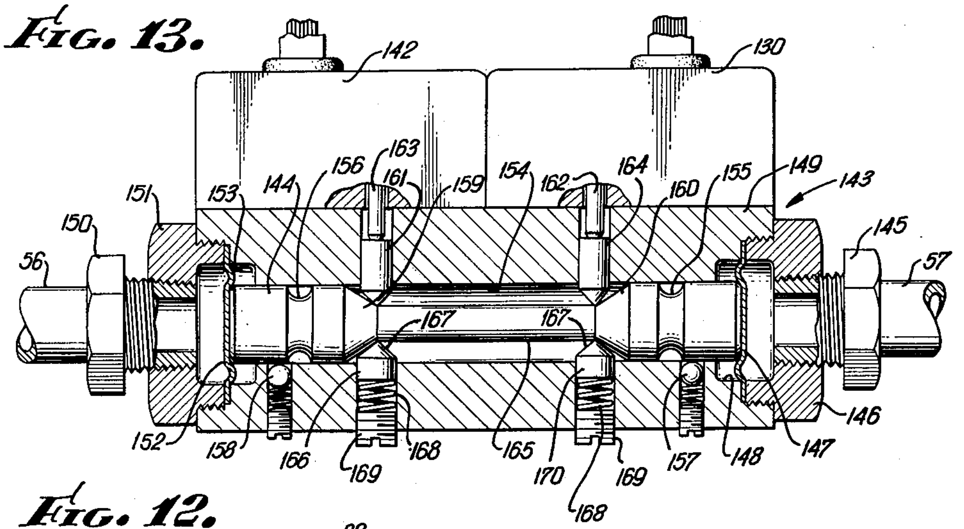
Figure 12:
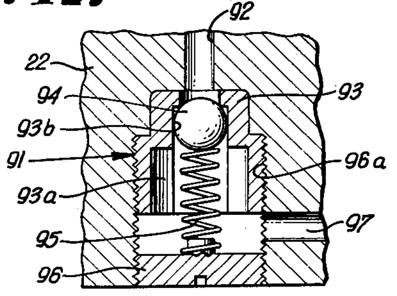
Figure 15:
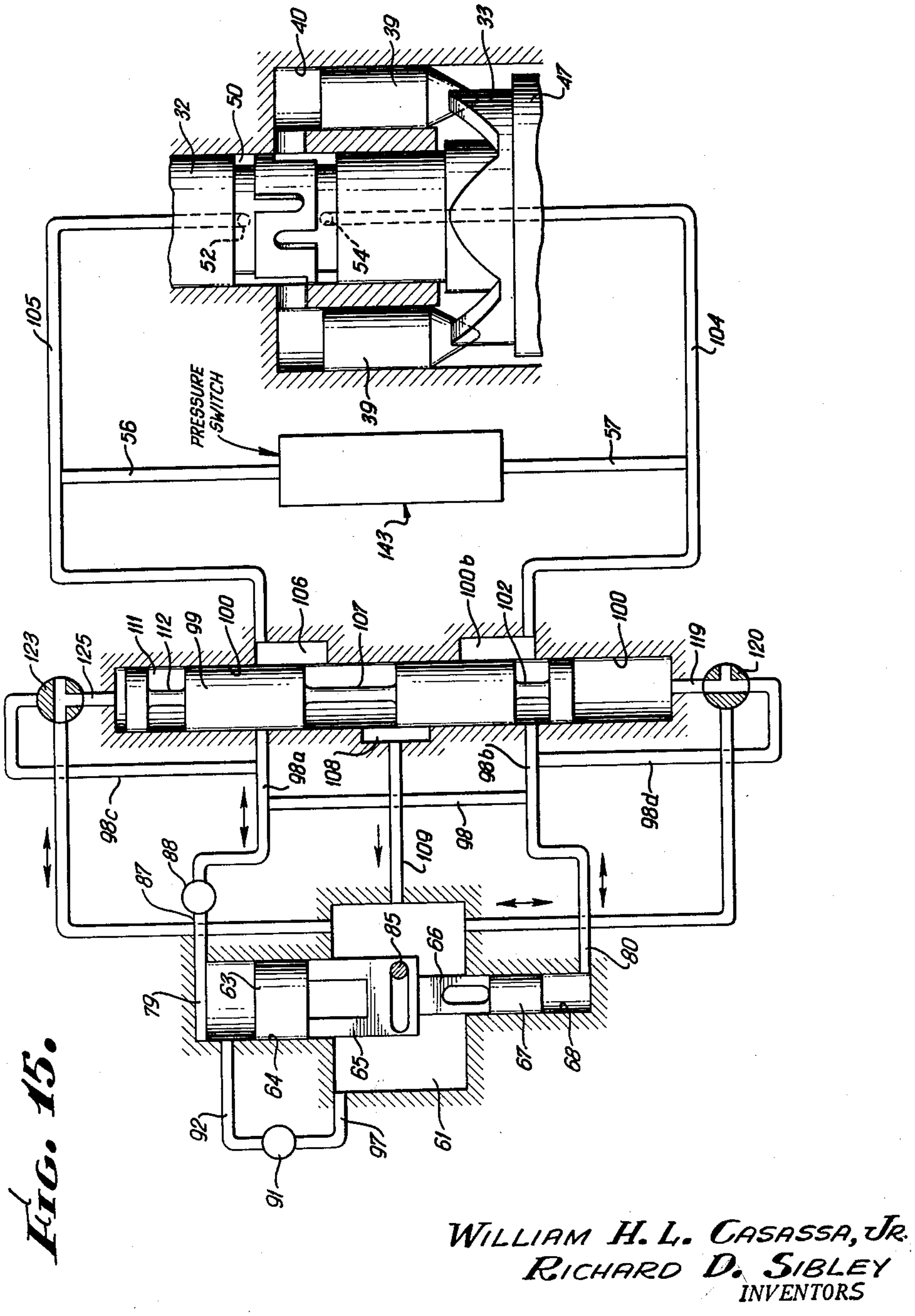
Figure 16:
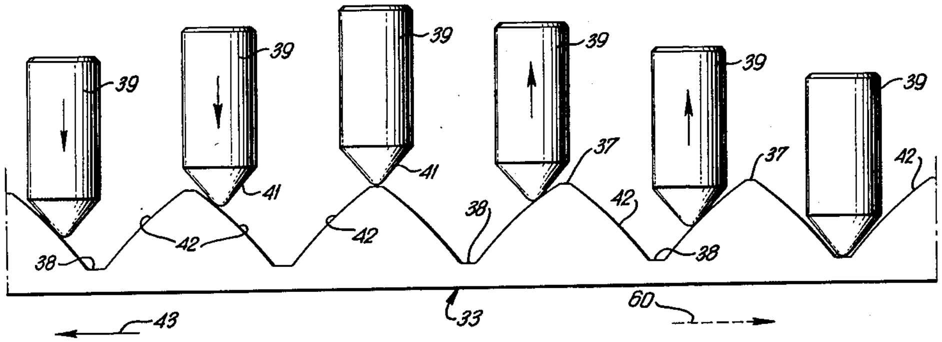
Figure 17:
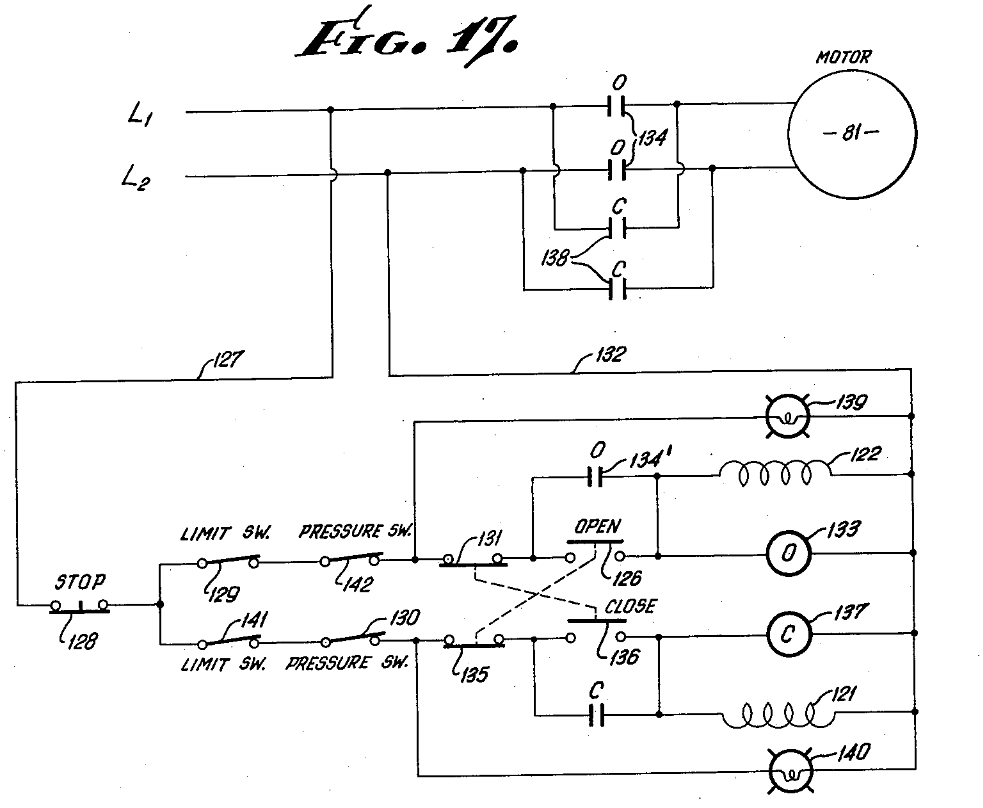

FIG. 3*a* is a further enlarged fragmentary sectional view of a portion of the apparatus shown in FIG. 3;

FIG. 4 is a detail sectional view, taken along a plane corresponding to line 4—4 of FIG. 3;

FIG. 5 is a sectional view, taken along a plane corresponding to line 5—5 of FIG. 3;

FIG. 6 is an enlarged fragmentary sectional view, taken along a plane corresponding to line 6—6 of FIG. 5;

FIG. 7 is a fragmentary view, taken along a plane corresponding to line 7—7 of FIG. 5;

FIG. 8 is an enlarged sectional view, taken generally along a plane corresponding to line 8—8 of FIG. 3;

FIGS. 9 and 10 are views taken along planes corresponding to lines 9—9 and 10—10 of FIG. 8;

FIG. 11 is a sectional view, taken along a plane corresponding to line 11—11 of FIG. 3;

FIG. 12 is a fragmentary enlarged sectional view, taken along a plane corresponding to line 12—12 of FIG. 11;

FIG. 13 is a sectional view of a pressure operated circuit controller utilized as a safety means, and shown in normal operating position;

FIG. 14 is a fragmentary view, similar to FIG. 13, illustrating an alternative position of the pressure responsive switch, and assumed upon excessive pressure in the hydraulic system;

FIG. 15 is a diagram of the hydraulic system to aid in explaining the operation thereof;

FIG. 16 is a development, mainly diagrammatic, of the hydraulic actuator mechanism utilized in the invention, for operating the stem of a gate valve or any other type of load; and FIG. 17 is a simplified wiring diagram of the system.

Figures 1, 2:
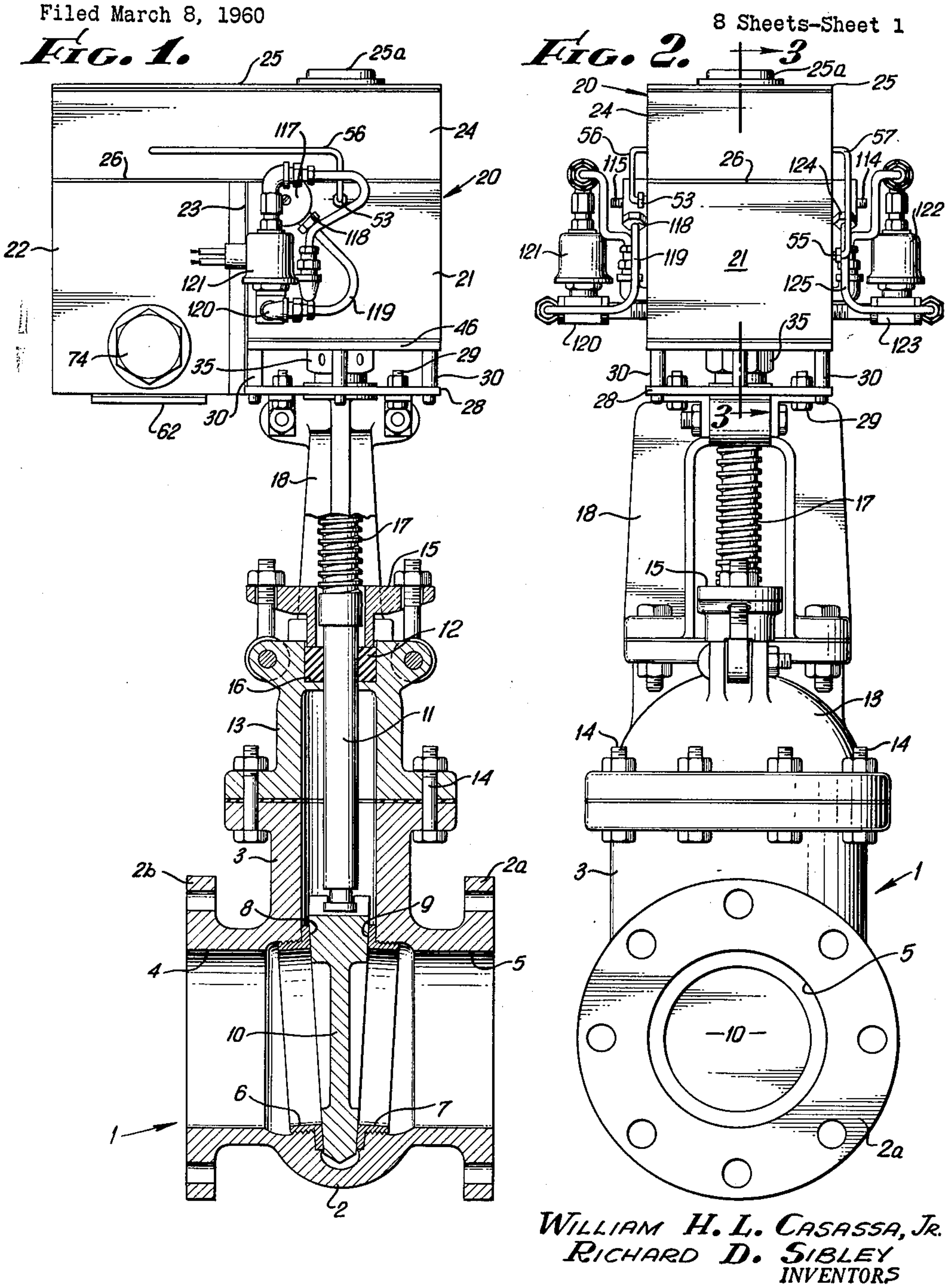
FIGURE 1 is a side elevation of an apparatus incorporating the invention, and shown as supported on a gate valve structure which is to be operated by the apparatus, the gate valve structure being indicated in partial longitudinal section.
FIG. 2 is a front elevation of the apparatus illustrated in FIG. 1.

In the present instance, the electrohydraulic system is shown as adapted to open and close a gate valve structure 1 (FIGS. 1 and 2). This gate valve structure has a body 2 equipped with end flanges 2*a* and 2*b* for ready connection to pipe lengths. The body has a hollow, upwardly directed, tubular extension 3, and oppositely directed openings 4 and 5. Each of the openings 4 and 5 can form either the inlet or outlet of the valve structure.

Externally threaded inserts 6 and 7 of generally tubular form are arranged to provide plane seating surfaces 8 and 9, formed as a flange, and adapted to be placed into sealing contact with a valve gate or closure 10. These surfaces 8 and 9 converge downwardly, and the gate 10 is shown as of wedge-shape so as to fit the surfaces 8 and 9 and to seat accurately therein when the valve is in the closed position of FIG. 1. Since such gate valve structures are well-known, only an outline of its structure as it bears on this invention will be set forth.

The closure 10 is shown as carried by the bottom of a valve stem 11. This valve stem is guided by the aid of a resilient backing sleeve 12 for vertical movement, thereby to raise and lower the gate 10 correspondingly to open and close the valve.

The sleeve 12 is carried in an extension 13 forming a valve bonnet appropriately fastened to the body 2, as by bolts 14. A strap 15 is used to urge the sleeve 12 against a shoulder 16 formed in the extension 13.

An extension 17, having square threads, forms a part of the stem 11. This extension 17 extends through the top of a two-part yoke 18. The two parts of the yoke 18 encompass an internally threaded bushing or nut 19 (FIG. 3). The gate valve closure 10 is arranged to be raised or lowered by rotating the nut 19, which is appropriately restrained against axial movement by yoke structure 18.

The structure as thus far described is commonly utilized for relatively large gate valves having ports as large as ten inches in diameter or more.

The following description is concerned with the manner in which the nut or bushing 19 is rotated in either direction to operate the gate valve closure 10.

The hydraulic mechanism controlled by aid of electric circuits is intended to be housed in a fluid-tight casing or housing 20 (FIGS. 1, 2, 3, and 3*a*). There are three separate parts, appropriately joined together, that comprise the housing 20. The lower portion of the housing 20 includes a right-hand part 21 and a left-hand part 22 (FIG. 3) having a gasket 23 interposed between them. As hereinafter explained, there are openings in this gasket to form communications for the passage of liquid through conduits formed in the casing parts 21 and 22. These two parts are held together by the aid of flanges **21*a* and 22*a*** (see also FIGS. 5, 8, 9, 10 and 11) and are held together by any appropriate means.

A supplemental casing 24 having a cover 25 extends completely over the housing elements 21 and 22. An appropriate gasket 26 is disposed between the upper housing 24 and the lower housings 21 and 22. A similar gasket 27 is interposed between the cover 25 and the casing 24.

The casing 24 is utilized to house the electric control elements, as will be described hereinafter.

The housing 20 with its enclosed parts is supported by the aid of the yoke 18. For this purpose, a base member 28 (FIGS. 1 and 2) is securely fastened to the top of the yoke 18, as by the aid of bolts 29. This base member supports spacers 30 which, in turn, are fastened to the bottom cover 46 of the right-hand housing portion 21. A gasket **46*a*** is interposed between the cover and the housing.

The housing member 21 carries a sleeve 31 (FIGS. 3, 3*a* and 8) which has an axis coincident with the axis of the screw 17. This sleeve 31 is firmly fixed in an appropriate opening in the housing 21. It serves as a bearing for an extended hollow column 32 (FIGS. 3 and 3*a*). The screw 17 is accommodated with clearance in the central opening of this column 32.

At its lower end, the column 32 is formed with a hexagonal portion 35. This hexagonal portion is splined to the upper extension 34 of the internally threaded bushing 19. A crown cam 33 is formed integrally with the column 32 (FIGS. 3, 3*a*, 15 and 16). Rotation of the crown cam 33 serves to lower and raise the stem 11.

If desired, a set screw 36 (FIGS. 3 and 3*a*) may be threaded transversely into the hexagon end 35 for further ensuring against relative movement between the lower end 35 of the column 32 and the bushing 19. The upper end of column 32 extends through an aperture in cover 25, which aperture is closed by a cap **25*a***.

The crown cam 33, as shown most clearly in FIG. 16, is provided in this instance with five crests 37 and five troughs 38 equiangularly spaced around the axis of the screw 17. For driving the cam 33 in either direction, use is made of a plurality of piston structures 39 (FIGS. 3, 3*a*, 8 and 16). In the present instance, there are six pistons 39 operating in appropriate cylinder bores 40 formed in the casing member 21. The number of pistons differs from the number of crests by one; the plurality of pistons furthermore constitute an even number. As will be apparent hereinafter, the number of pistons as related to the number of crests must be such that there is never any dead center position, and that there is a substantially continuous torque urging the cam 33 in one or the other direction.

Each of the pistons 39 has a longitudinal axis parallel to the axis of the screw 17. The axes of the pistons are equiangularly arranged about the cam axis. Each piston is furthermore provided with a tapered lower end 41 adapted to contact the sloping sides 42 of the crown cam structure 33.

By appropriate valving arrangement hereinafter to be described, the pistons 39 are operated in such sequence that they angularly urge the crown cam 33 in one or the other direction. In the position shown in FIG. 16, the two left-hand pistons 39 are urged downwardly by hydraulic fluid passed under pressure into the corresponding cylinder spaces 40 (FIGS. 3, 3*a*, 8, 15 and 16). The third piston 39 has its lower end resting on a crest 37 and is momentarily not moving either upwardly or downwardly. The next two pistons 39 are operating in cylinder spaces 40 which are connected to the exhaust side of the system. Accordingly, they are urged upwardly by the movement of the cam structure 33 toward the left, as indicated by arrow 43.

Lastly, the tapered end of right-hand piston 39 rests in the trough 38. Momentarily it has no movement in either direction.

There is a slight clearance between the lower tapered end of the right-hand piston 39 and the crown cam 33. In this way, some angular movement of the cam 33 is permitted before this right-hand piston is urged upwardly by the cam. This makes it possible to ensure that the cylinder space 40 in which the piston operates will have been connected to an exhaust port to permit rise of this right-hand piston 39.

In order to reverse the rotation of the crown cam 33, the valving arrangement is such that in the position of FIG. 16, the fourth and fifth pistons, counting from the left, would be urged downwardly by fluid pressure, and the two extreme left-hand pistons would be permitted to be moved upwardly by movement of the cam 33 toward the right.

The housing 21 is formed of substantially solid metal in which the bores 40 are provided (FIGS. 8 and 11). At the lower ends of these cylinder spaces 40, arcuate slots 44 (FIG. 11) are formed for permitting passage of the crown cam 33.

The sleeve 31, as shown most clearly in FIG. 8, is provided with ports **31*a* in communication with cylinder ports 40*a*** for providing passageways for the hydraulic liquid into and out of the cylinder spaces. The sequence of operation will be described hereinafter.

A space 45 (FIGS. 3 and 3*a*) is provided by casing 21 beneath the cylinders 40, and defined by cover 46 (FIGS. 3 and 3*a*). A flange 47, carried by the crown cam 33, serves as a ball race for ball bearing structure 48. Cover 46 serves as a lower ball race. The ball bearing structure thus rolls along the inner surface of the cover 46. Appropriate sealing means 49 is provided between the cover 46 and the lower end 35 of the column 32.

Two annular grooves 50 and 51 (FIGS. 3, 3*a* and 15) are formed at the periphery of the column 32. Continuously communicating with the lower groove 51 is a port 52 (see particularly FIG. 8). This port is formed by drilling through the solid part of casing 21, and extends through the bearing sleeve 31. It is closed by a plug member 55.

The upper groove 50 is similarly connected to a port 54 having a plug closure 53. These plug closures 53 and 55 can also be seen in FIGS. 1 and 2. The plug 53, connecting to the upper groove 50, serves also as a coupling to a control conduit 56. The plug 55 similarly serves as a coupling for a control conduit 57. These control conduits are connected to a safety pressure responsive device to shut down the system in the event abnormally high pressures exist at either of the ports 52 or 53. This pressure responsive device will be described in detail hereinafter.

Communicating with the upper groove 50 is a group of slots or ports 58 formed in column 32. The ports 58 are formed as recesses opening into the periphery of column 32. Their lower ends are adapted to register with ports **31*a* and 40*a* that lead to the top of the cylinder spaces 40. As the column 32 rotates, these ports 58** come into and go out of register in succession.

Intergrouped with the group 58 is another group of ports 59 which are in continual communication with the lower groove 51. There are as many slots in each set of ports 58 or 59 as there are crests of the cam 33. Accordingly, there are five such ports in each group. The closed ends of all of the ports 58 and 59 are in such axial position as to cooperate properly with ports 31*a* and 40*a* (see particularly FIGS. 3 and 3*a*).

Assuming that the port 54 is supplied with hydraulic fluid under pressure (in a manner to be hereinafter described), then the ports or slots 58 are likewise all supplied with fluid under pressure. Accordingly, for the position of column 32 as shown in FIG. 8, the three pistons 39 to the left of the axis of the column 32 are urged downwardly, and the other three pistons to the right of the axis are connected to the exhaust through the ports 58 and 54.

It has been assumed that the port 54 corresponds to the pressure port, and the port 52 corresponds to the exhaust port. By interchanging these two ports and providing hydraulic fluid under pressure through port 52, there would be a reversal of the direction of rotation of the crown cam 33. This is obvious when we consider the arrows in the pistons 39 shown in FIG. 16. Upon reversal of these arrows indicating a reversal in the connections, the cam 33 would be moved toward the right, as indicated by the dotted-line arrow 60 in FIG. 16. This is true because there are an even number of pistons 39 and the combined number of ports 58 and 59 (twice five) is also even; and, therefore, diametrically opposite chambers 40 are respectively connected to the pressure side and the exhaust side of the system. FIG. 8 illustrates by plus and minus signs respectively the pressure and exhaust connections. Of course, other quantities than these may be used for the pistons and crests; the specific quantities of six pistons and five crests are merely representative. Generally the two quantities must each have at least one prime factor different from a prime factor of the other quantity.

FIGS. 3, 3*a*, 8, 9, 10 and 11 show the various conduits by the aid of which fluid under pressure may be supplied alternatively to the port 52 or to the port 54.

The hydraulic liquid under pressure is produced by a pump structure accommodated in the casing or housing section 22. This housing section has a chamber 61 closed by a cover 62 (FIGS. 3 and 4) which serves as a reservoir or receiver connected to the exhaust. It also serves as a source of supply for the liquid to be pumped. The pump structure in this instance is shown as including a relatively large piston 63 working in a cylinder 64 (FIGS. 4 and 11) appropriately provided with sealing rings. It is connected, as by the aid of the stems 65 and 66, to an oppositely directed small piston 67 working in a cylinder 68. The stems 65 and 66 are purposely provided with openings, such as 69 and 70, to permit ingress of liquid to the cylinder spaces past an appropriate check valve. Since the structure of such pumps is well-known, further description is not necessary.

The outlet from the cylinder 64 is controlled by a spring-pressed valve plate 71. A similar valve plate 72 controls the outlet from the cylinder 68. Hollow threaded caps 73 and 74 hold the compression springs 75 and 76 in proper operative position with respect to the valve plates 71 and 72. These caps are threaded into bosses 77 and 78 extending around the ends and appropriately attached to the exterior of casing member 22. Valve plates 71 and 72 rest on apertured cylinder covers 64*a* and 67*a* when the pump is inactive.

The caps 73 and 74 are provided with cooperating passages 73*a* and 74*a* to form ports to pump outlet passages 79 and 80. These passages are formed in bosses 77 and 78.

Above the pump structure in the housing member 22 there is appropriately supported in chamber 22*b* an electric motor 81 (FIG. 3). The shaft 82 is provided with appropriate bearing structures 83 and 84 respectively in the upper cover 84*a* for chamber 22*b* and in the lower wall of the chamber. The shaft 82 operates an eccentric pin 85. This eccentric pin 85 works in a transverse slot 86 for reciprocating the piston structures 63 and 67. While one piston structure is moving to force liquid into its outlet passages, the other piston is being retracted to draw in liquid from the reservoir space 61.

In normal operation, the outlet passages 79 and 80 work in parallel to supply fluid under pressure either to port 52 or 54. This may be best explained in connection with FIGS. 8, 11 and 15.

Thus, the passage 79 leads to a passage 87 in casing member 22, in which is located a check valve structure 88. This check valve structure may be of any conventional form. For example, it includes a ball 89 urged against its seat by the aid of a compression spring 90. The spring 90 is so proportioned that when the pressure on the outlet side of the valve 88 reaches a desired maximum value, the check valve remains closed, thus stopping passage of liquid from the larger cylinder 64. At the same time, a relief valve 91 (FIGS. 12 and 15) opens when the check valve 88 remains closed. Its structure can be best explained in connection with FIGS. 11 and 12.

A passage 92 in member 22 leads from the cylinder 64 to the top of a ball cage 93. This ball cage provides a seat for the ball 94 urged to closed position by the aid of a compression spring 95. This compression spring rests upon the inner surface of a cap 96 threaded into a tapped aperture 96*a* in the casing member 22. The cage 93 is also threadedly engaged in a threaded aperture 96*a*. Cage 93 has longitudinal passages 93*a* extending radially outwardly from bore 93*b* for ball 94. These passages communicate with aperture 96*a* and outlet 97.

When the ball 94 is unseated by the pressure of the liquid in the passage 92, the liquid can pass through the cage and out through outlet 97 (FIGS. 11 and 15) directly to the reservoir 61.

When the relief valve 91 opens, only the motion of smaller piston 67 is effective to supply liquid under pressure to move the crown cam 33. This causes a gradual, easy closing of the gate 10 in its seat at the terminal closing period.

The outlets 79 and 80, as shown in FIG. 15, are joined together by a cross conduit 98. This conduit (FIG. 9) is formed as a groove in the left-hand face of casing section 21, and is covered by gasket 23. Grooves 98*a* and 98*b* are similarly formed, and are provided with lateral extensions 98*c* and 98*d*. These form threaded apertures 98*f* and 98*g* opening on opposite sides of casing member 21 for passing liquid under pressure into grooves 98, 98*a* and 98*b*. These grooves thus form passages optionally to ports 52 and 54. Ports 98*h* and 98*j* (FIG. 10) in casing 22 are in registry with the lower ends of grooves 98*a* and 98*b* and represent the ends of pump outlet passages 80 and 87.

A piston valve closure 99 is slidably mounted in an appropriate pilot cylinder 100 formed as a sleeve insert in casing member 21 (FIG. 8). This valve closure 99 determines whether port 52 or port 54 be connected to the outlets 80 and 87. Thus, in the position shown in FIGS. 8 and 15, the port 54 is connected to these outlets by way of conduit 98*b*, recess 103 in casing 21, port 103*a*, around the reduced portion 102 of the closure 99, aperture 100*a* in sleeve 100, elongated passage 100*b* and conduit 104. This conduit 104 intersects port 54, as shown most clearly in FIG. 8.

The exhaust from port 52 is effected by corresponding conduit 105, elongated passage 106, opening 100*c* in sleeve 100, the space around the reduced portion 107 of the closure 99, opening 100*d* in sleeve 100, elongated passage 108, and conduit 109 to the space 61. This conduit 109 is shown in FIG. 10, as well as in FIG. 3, as extending downwardly so as to reach the reservoir chamber 61. Furthermore, a port 110 is illustrated in FIG. 3 for permitting the passage of liquid that collects in chamber 45 to the reservoir 61, past the relatively loosely fitted pistons 39.

An alternative position of closure 99 is such that these connections to ports 52 and 54 are interchanged. Downward movement, as viewed in FIGS. 8 and 15, of this closure member 99 will cause the conduit 105 to be connected to the outlets 79 and 80 of FIG. 11, and port 54 would then be connected via conduit 104 to the exhaust conduit 109.

In this alternative position of the closure 99, the space 111 around the reduced portion 112 of the closure 99 serves to connect port 105 to the passage 106, opening 100*c*, and thence to a passage 113 which is connected appropriately to the outlet passage 98*a* of the pump structure. Similarly, the reservoir 61 is connected to port 54 through the space around the reduced portion 107 of the closure 99, opening 100*a* and recess 100*b*.

To limit the axial movement of the slidable pilot valve closure 99, use is made of the two adjustable set screws 114 and 115, indicated in FIGS. 2 and 8. These set screws extend through end caps 116 and 117 attached to each side of the casing member 21. By appropriate adjustment of these screws 114 and 115, it is possible to determine the extent of opening of the valve passages whereby control of the speed of operation can be determined, the pilot valve closure 99 and the cylinder 100 thus acting as a throttle valve. Thus, assuming that screw 114 as viewed in FIG. 8 were threaded further into cap 116, part of the opening 103*a* would be closed by the periphery of valve 100.

Cap 117 is provided with a fitting 118 for connecting a conduit 119 into the cylinder 100 at its lower end. This conduit 119 leads to a valve structure 120 (FIGS. 1, 2 and 15) that is operated by an electromagnet 121. When this electromagnet is energized in a manner to be hereinafter described, the valve structure 120 is in a position to connect the cylinder 100 with the pressure conduit 98*b* to urge the closure 99 upwardly. At the same time, there is an electromagnetically operated valve structure 122 which is deenergized when the electromagnet 121 is energized. In the deenergized position, the corresponding valve structure 123, shown in FIG. 15, is in a position to exhaust the cylinder above the piston valve 99 to the reservoir 61.

It may be assumed that energization of the solenoid or electromagnet 121 corresponds to a closing movement of the stem 11 (FIG. 1). Corresponding energization of the electromagnet 122 causes an opening movement of the stem 11. Valve 123 operated by electromagnet 122 has a conduit 125 similar to conduit 119 of valve 120. The fitting 124 into which conduit 125 leads (FIG. 8) cooperates with the upper end of the cylinder 100. When electromagnet 122 is energized and electromagnet 121 is deenergized, the positions of valves 120 and 123 are reversed, and valve closure 99 moves downwardly into contact with screw 115.

The control circuits for the system are indicated diagrammatically in FIG. 17. The mains L1 and L2 are adapted to be connected to a commercial source and are intended to provide energization of the solenoids 121 or 122 to determine whether the cam 33 will rotate in one or the other direction.

Thus, for example, if a push button 126 is urged to complete a circuit, this push button will serve to energize the solenoid 122 for the purpose of opening the gate 10. The circuit is completed from line L1, connection 127, a stop button 128, a limit switch 129, a pressure switch 142, a normally closed switch 131, push button 126, electromagnet 122 and connection 132 to line L2.

The button 126 may be designated as the "open" button corresponding to the opening movement of the valve. The limit switch 129 serves to ensure disconnection of the apparatus upon completion of the opening movement.

The pressure switch 142, as hereinafter explained, serves, for safety reasons, to open the circuit upon the attainment of abnormally high pressure in the outlet of the pump structure.

A circuit is also completed in parallel to an electromagnet coil 133 which operates contacts 134, energizing the pump motor 81.

As soon as the electromagnet 133 is energized, a holding circuit is completed around the push button 126 by closing of the contacts 134'. These contacts are operated by electromagnet 122. Furthermore, operation of the push button 126 causes opening of a switch 135 located in the circuit for the solenoid or electromagnet 121. In this way, it is assured that it would be impossible to energize the circuits for the solenoids 121 and 122 simultaneously.

The "closing" push button 136, when urged to close, serves as well to open the switch 131 in order to complete the interlocking function.

The push button 136 also serves to energize an electromagnet 137, causing closing of the contacts 138 to maintain energization of the pump motor 81. Pilot lights 139 and 140 indicate in which direction the gate 10 is moving.

The limit switch 141 and pressure switch 130, located in the circuit of the push button 136, are operated in the same manner as limit switch 129 and pressure switch 142.

The pressure switches 130 and 142 are operated hydraulically in a manner now to be described. This pressure switch mechanism is illustrated in FIGS. 13 and 14. FIG. 13 shows the position of the mechanism while the fluid pressure in the hydraulic system is below the abnormal pressure required to open the switch 142 or 130. A plan view of the switch structure 143 is shown in FIG. 5. The pressure switches 142 and 130 are also indicated. This structure is located in the upper casing 24.

In FIG. 13, the conduit 57 carries fluid under pressure for urging a piston member 144 toward the left. Conduit 57, as hereinbefore stated, is connected to the outlet of the pump structure. Conduit 56 under such circumstances is connected to the reservoir 61, as indicated in FIG. 15.

The conduit 57 is provided with a fitting 145 threaded into a hexagonal headed hollow screw 146. This screw 146 serves to attach a flexible diaphragm 147 over an opening 148 in the frame 149 of the pressure switch mechanism 143. This screw is threaded into an enlarged tapped aperture in casing 149. The two pressure switches 142 and 130 are disposed between spaced parallel walls extending from the casing 149, as indicated most clearly in FIG. 5.

Similarly, conduit 56 at the right-hand end of the apparatus is provided with a fitting 150 threaded into a hollow screw 151 which serves to fasten a diaphragm 152 across an opening 153 in frame 149.

Openings 148 and 153 constitute enlargements of a bore 154 in which the piston 144 is slidable. The piston 144 has a pair of annular grooves 155 and 156 adapted to be engaged by a ball detent 157 or 158.

Conical surfaces 159 and 160 are formed on the piston 144, and are connected by the intermediate reduced portion 165 of the piston 144. These surfaces 159 and 160 are opposed to each other. In the normal position shown, a slidable pin 161 rests on the cylindrical surface of portion 165 in close relation to conical surface 159. Stem 163 of switch 142 is in contact-closing position. Similarly, the stem 162 of switch 130 is in its innermost position, the pin 164 being lowered to contact the reduced portion 165 of piston 144, and in close relation to conical surface 160.

The fluid pressure on the right-hand side of piston 144 is substantially greater than the pressure on the left-hand side, because conduit 57, as shown in FIG. 15, is connected to the pump outlet, and conduit 56 is connected to the exhaust side. Nevertheless, the normal position illustrated in FIG. 13 is maintained by means to be now described.

Plungers 166 and 170, guided transversely of bore 154, have tapered ends 167 opposing the pins 161 and 164. They are urged into contact with piston 144 by compression springs 168. The forces of these springs are adjustable by the aid of headless screws 169. Any incipient movement of piston 144 toward the left under the influence of superior pressure causes the tapered end 167 of plunger 170 to move outwardly along the tapered surface 160. This movement causes compression of spring 168 of plunger 170, increasing its restraining force. By appropriate adjustment of the initial compression of springs 168, a normal preponderance of pressure in conduit 57 over that in conduit 56 is insufficient to move piston 144 far enough to the left to operate switch 130. Obviously, a similar action occurs rightward when the conduit 56 is connected to the outlet of the pump structure for causing opening motion of the valve gate.

When the pressure in conduit 57 attains a value sufficiently great to be dangerous, the diaphragm 147 is urged to the left, even when opposed by the action of plunger 170, and moves piston 144 leftward. The movement continues until ball 158 seats in its groove 156 (FIG. 14). This ball detent is readily disengaged as soon as conduit 56 supplies fluid under pressure to the left-hand side of the diaphragm 152. In the position of FIG. 14, switch 130 is opened, while switch 142 remains closed. Accordingly, only the "open" button 126 (FIG. 17) can be effective to provide a reverse movement of the cam 33. It is thus necessary to reverse the motion of the valve gate 10 before the gate can be operated in the direction that corresponded to the abnormal pressure. This feature ensures against inadvertent repetition of the rise in fluid pressure.

The limit switches 129 and 141 shown in FIG. 17 are also illustrated in FIGS. 5 and 7. They are mounted on the bottom wall of the supplemental casing 24. These switches are provided with plungers 171 and 172. These plungers are in the path of movement of the operators 173 and 174. These operators are in the form of machine screws engaging in an arcuate slot 175 and therefore adjustable along the arcuate length of this slot. The slot 175 is formed in a plate 176 that is conveniently rotatably mounted near the top of the column 32. In order to accomplish this, the column 32 is provided with a shoulder 177 (FIG. 6) upon which the plate or disk 176 rests. It is restrained against axial movement by the aid of a collar 178 attached, as by a set screw 179, to the column 32.

The rate of angular movement of the disk or plate 176 is very much less than the angular movement of the column 32. In this way, a relatively short angular movement of the disk 176 is sufficient to correspond to complete opening or closing movement of the cam structure 33.

In order to drive the disk 176, a reduction mechanism is provided, driven directly by the angular motion of the column 32.

Thus, supported on the column 32 is a worm 180 in engagement with a worm wheel 181. This worm wheel is mounted on a shaft 182 appropriately journalled by the aid of a bracket 183 mounted on the bottom of the casing member 24. The shaft 182 drives another worm 184 which, in turn, drives a wheel 185 (FIGS. 3, 3*a* and 5). The worm wheel 185 is mounted on a shaft 186 upon which is mounted a driven gear wheel 187. This wheel 187 drives a gear wheel 188 of relatively large diameter. This wheel, in turn, drives a disk 189 by the aid of a link 190. The ends of the link are appropriately mounted in slots 191 and 192 by the aid of which the ratio of the transmission just described can be quite accurately adjusted.

The disk 189, as shown most clearly in FIG. 6, is mounted for rotation upon a screw 193 supported on the bottom wall of the casing member 24. This disk drives a headed eccentric pin 194 having a threaded end. A nut **194*a* engages the threaded end, and serves to couple the pin 194 to a driving link 196. A spacer sleeve 195 surrounds the pin and extends between the driving link 196 and the disk 189. The driving link 196, in turn, drives the disk 176, as by the aid of the pivotal coupling structure 197**.

FIG. 6 also shows a sealing ring 198 engaging the column 32 adjacent its upper end. The sealing ring is held in a flanged metal ring 199.

The casing 24 thus appropriately supports the pressure switch mechanism 143 as well as the drive mechanism for the limit switch actuators 173 and 174. It also appropriately supports terminal blocks 200 by the aid of which appropriate electrical connections may be effected. The casing 24 is also appropriately provided with openings in the wall for the passage of cables 201 and 202 for the purpose of providing appropriate electrical connections.

The inventors claim:

1. In a control system: an actuator having a fluid pressure operated element for moving the actuator; conduits providing an inlet port and an outlet port for the element; a pump structure for supplying pressurized fluid to the element; an electric motor for driving the pump structure; a circuit controller for the motor; means for operating the circuit controller to deenergize the motor upon abnormal resistance encountered by the actuator, comprising a casing; a bar slidable in the casing; pressure responsive means for moving the bar; said bar having a cam surface; means operated by the cam surface for operating the circuit controller; means movable transversely of the bar and engaged by the cam surface, for opposing movement of the bar; and adjustable resilient means for urging the transversely movable means toward the cam surface.

2. The combination as set forth in claim 1, in which the cam surface is conical, and the means opposing movement of the bar has a tapered end engaging said cam surface.

3. In a hydraulic system: a reversible load having terminal positions for both directions of motion; a load driving member operable by liquid pressure optionally to move the load in either direction; a pump structure for supplying liquid to said member, and having a pair of pumps; a pair of conduits respectively for leading liquid from the pumps to the member and for returning the liquid from the member to the pumps; a third conduit connecting the outlet sides of the pumps; valve means for connecting said third conduit optionally to either of the pair of conduits, and for connecting the other of the pair of conduits to the pump structure; a first pressure responsive check valve interposed between the outlet of one of the pumps and the third conduit, and having a spring resisting opening of the first pressure responsive valve; a bypass conduit between the output and input side of said one of said pumps; and a second check valve in said bypass conduit capable of opening under a pressure lower than the pressure acting on the outlet side of the first check valve, whereby only the other of said pumps is effective when the load reaches either terminal position.

4. The combination as set forth in claim 3, in which the load is a closure for a gate valve, the pumps being operated in unison, and in which said other pump has less volume output than the said one of the pumps.

5. In a hydraulic drive system: a movable actuator having a hydraulic element for moving the actuator; a pump structure for pressurizing liquid for moving the actuator; an electric motor for driving the pump structure; electrically operated hydraulic valve means for reversing the motion of said actuator; circuit control means advanced by the movement of the actuator in either direction for deenergizing the motor at the conclusion of the operative movement of the actuator; and means affected by resistance encountered by the actuator beyond that normally encountered at the conclusion of the operative movement for deenergizing said motor as well as for conditioning the hydraulically operated valve means for reversing the motion of the actuator when the motor is reenergized.

6. The combination as set forth in claim 5, in which the means affected by the resistance encountered by the actuator includes: a cylinder; a piston mounted in said cylinder, and urged in opposite directions by liquid pressure respectively when the actuator moves in opposite directions; and circuit controllers affected respectively by the motion of the piston in each direction.

7. The combination as set forth in claim 5, in which the means affected by the resistance encountered by the actuator includes: a cylinder; a piston mounted in said cylinder, and urged in opposite directions by liquid pressure respectively when the actuator moves in opposite directions; circuit controllers affected respectively by the motion of the piston in each direction; and adjustable means resisting the movement of the piston in either direction.

8. In a hydraulic control system: an actuator having a liquid pressure operated element for moving the actuator; conduits providing an inlet port and an outlet port for the element; a pump structure for supplying pressurized liquid to the element; an electric motor for driving the pump structure; a circuit controller for the motor; and means for operating the circuit controller to deenergize the motor upon abnormal resistance encountered by the actuator, comprising a cylinder; a piston structure slidable in the cylinder; means responsive to the liquid pressure in the inlet conduit for urging the piston structure to move with respect to the cylinder; said piston having a cam surface; means operated by the cam surface for operating the circuit controller; and resilient means cooperating with the cam surface for opposing movement of the piston structure.

9. In a hydraulic control system: an actuator having a liquid pressure operated element for moving the actuator in either direction; a pair of conduits for providing an inlet port and an outlet port for supplying liquid under pressure through the inlet port and for returning liquid from the element; a pair of electrically energizable means for interchanging the inlet and outlet ports for causing reversal in the direction of movement of the actuator; a circuit controller for the motor; and means for operating the electrically energizable means and the circuit controller for the motor to deenergize the motor and to operate the circuit controller so as to condition the actuator element for reverse operation upon abnormal resistance encountered by the actuator, comprising a cylinder; a piston structure slidable in the cylinder; a pair of circuit controllers operable upon movement of the piston structure; the motion of the piston structure in one direction serving to cause one circuit controller to condition the pair of electromagnets for reverse operation of the actuator, and for deenergizing the motor; and means for subjecting oppositely the liquid pressure in the inlet port to the piston structure.

10. The combination as set forth in claim 9, in which the piston structure is provided with spaced conical portions serving as cams for operating said pair of circuit controllers; and with the addition of resiliently urged plungers contacting said surfaces to oppose the sliding motion of said piston structure.

11. In a liquid pressure responsive circuit controller: a cylinder; a piston structure slidable in said cylinder; said cylinder having ported end heads for impressing hydraulic pressure at either end of the piston structure; said piston structure having a central reduced portion joined by conical portions to the piston structure ends; a first pair of plungers respectively adjacent the places where the reduced portions meet the conical portions; means adjustably urging the first pair of plungers against the piston structure; a pair of circuit controllers; and a second pair of plungers for respectively operating the circuit controllers and respectively moved by the conical portions as the piston structure moves in either direction.

References Cited in the file of this patent

UNITED STATES PATENTS

| | | |
|---|---|---|
| 1,616,841 | Beebe | Feb. 8, 1927 |
| 1,982,711 | Vickers | Dec. 4, 1934 |
| 2,095,255 | Holmes | Oct. 12, 1937 |
| 2,113,161 | Osborne | Apr. 5, 1938 |
| 2,239,481 | Christensen | Apr. 22, 1941 |
| 2,307,544 | Robinson | Jan. 5, 1943 |
| 2,325,138 | Kyle et al. | July 27, 1943 |
| 2,389,942 | Thumim et al. | Nov. 27, 1945 |
| 2,560,676 | White | July 17, 1951 |